United States Patent Office 2,898,810
Patented Aug. 11, 1959

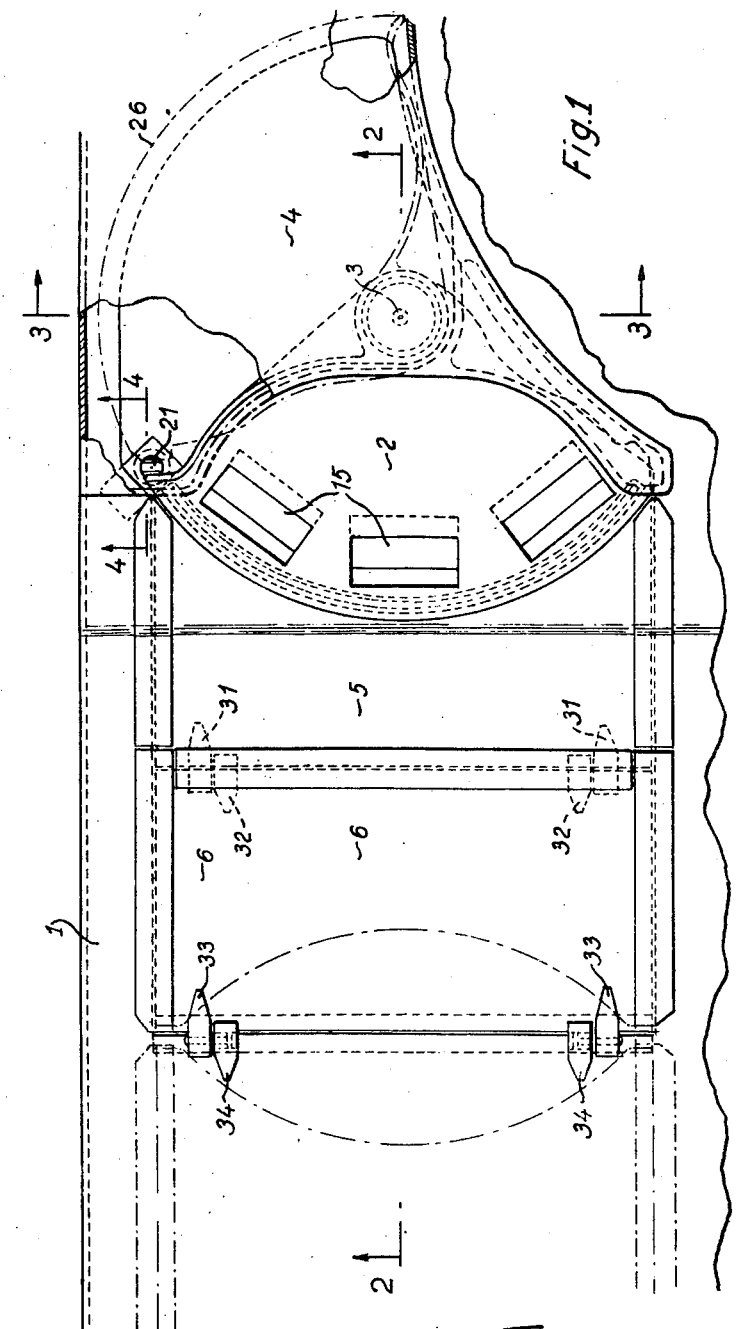

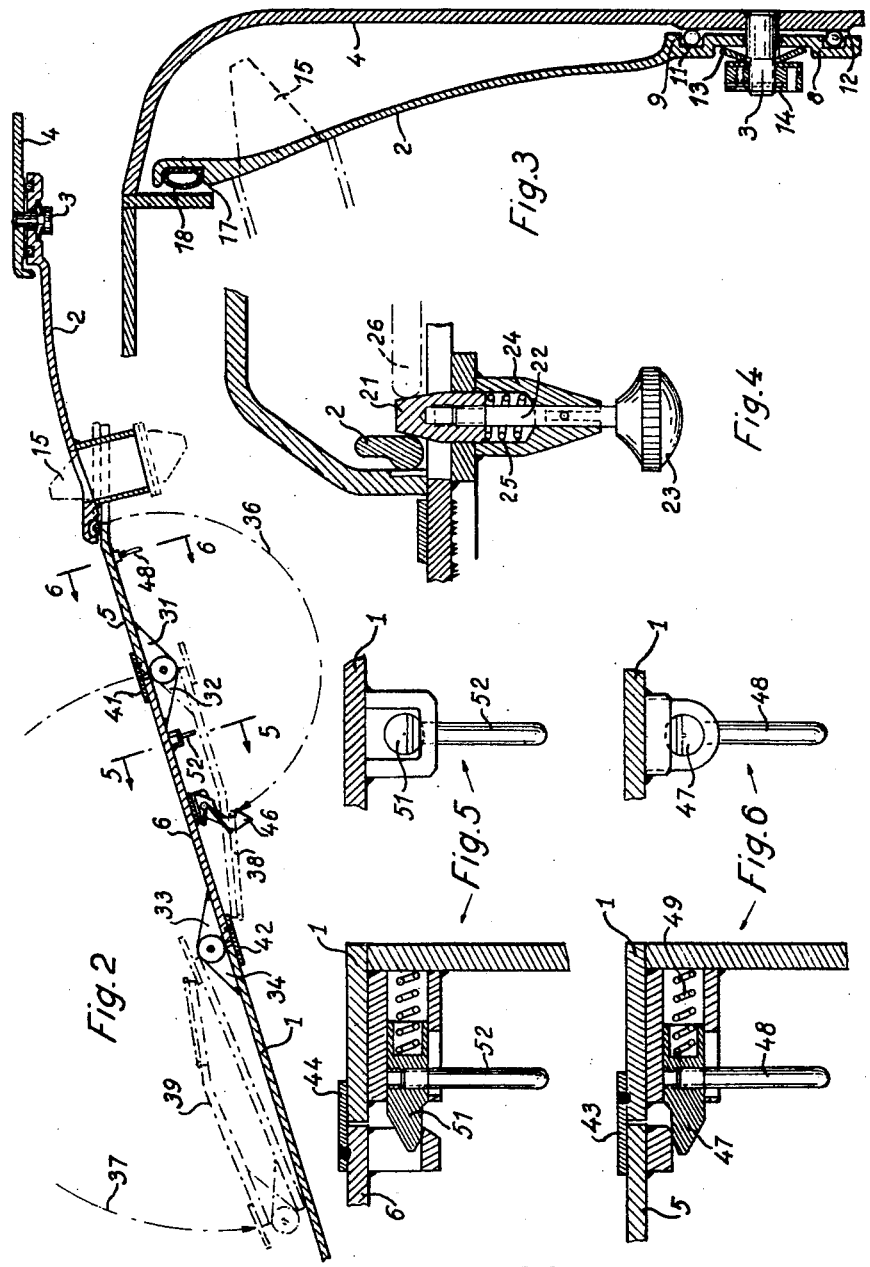

2,898,810

OVERHEAD PROTECTION HOOD ON COMBAT VEHICLES

Georges Even, Paris, France

Application October 3, 1955, Serial No. 538,221

Claims priority, application France October 12, 1954

3 Claims. (Cl. 89—36)

The present invention relates to armoured vehicles.

The invention has for its purpose to improve the arrangement of the cockpit of such a vehicle in order that the occupants may be selectively and according to circumstances either entirely protected and completely enclosed in said cockpit or more comfortably installed with partial access outside or again free to rapidly and readily get out of the vehicle. In some armoured vehicles, the occupants may be positioned under the firing arms when the latter assume given positions. It is essential in such a case, that the cockpit be so designed as to enable the occupants to escape, if need be. For this purpose, the protecting elements therefore, should be retractable within a space of which the vertical dimension is sometimes extremely reduced.

In order to achieve this result, it is an object of the invention to provide an armoured vehicle with a retractable protecting element pivotally mounted on a substantially vertical axis, said element being adapted to complete a hood the fore portion of which is cut out and so designed as to be possibly obturated by said pivoting element.

Preferably, the said retractable protecting element carries viewing instruments such as periscopes, episcopes or the like, which are exclusively to be used when said element is in operative position.

It is then a particular object of the invention to give to the retractable element the shape of a sector of a circle coaxial with a circular hood the cut-out portion of which is adapted to be inscribed within said sector. With this arrangement, the optical instruments may be angularly spaced near the periphery of said sector to give to the servant under the hood a maximum scope of observation.

Another object of the invention is to complete the above described retractable element by a set of hinged shutters normally covering an opening extending forwardly from the aforesaid hood, so that, once these shutters are opened and the sector-shaped pivoting element turned into retracted position, the occupants are able readily to get out of the tank even if the weapons are momentarily positioned above them.

Other and further objects of the invention will appear from the following detailed description, together with the accompanying drawing, submitted for purposes of illustration only and not intended to define the scope of the invention, reference being had for that purpose to the subjoined claims.

Figure 1 diagrammatically shows, in top view, an arrangement of retractable elements of the cockpit of an armoured vehicle according to the invention.

Figure 2 is a vertical sectional view along line 2—2 of Figure 1.

Figure 3 is an enlarged vertical sectional view at right angles to that of Figure 2 and taken along line 3—3 of Figure 1.

Figure 4 is a still more enlarged vertical sectional view along line 4—4 of Figure 1 and shows in detail a device for locking the retractable element in view of closing the cockpit.

Figures 5 and 6 are also enlarged sectional views along lines 5—5 and 6—6 of Figure 2, respectively, showing devices for locking the hinged shutters of the cockpit.

Referring first to Figure 1, there is shown a portion of the upper face 1 of an armoured vehicle. According to the invention, an opening with a suitable outline is cut out in this upper face and is provided with retractable elements adapted to normally close the cockpit of the vehicle. These retractable elements, which will be described more in detail hereinunder, comprise, on the one hand, a cover 2 pivotally mounted on a vertical stud 3 (see also Figure 3) to be retractable under a hood 4 and, on the other hand, two hinged shutters 5 and 6.

The pivoting cover 2 has the shape of a sector of a circle the chord of which is substantially equal to the width of the shutter 5, and it is adapted to assume two positions, namely, an operative position, which is that shown in Figure 1, in which it completely obturates the cut-out portion of the hood while its peripheral edge overlaps the corresponding edge of the shutter 5, and a retracted position in which it is concealed under the stationary hood 4 while the cut-out portion of the latter is entirely uncovered. Rigid with the pivoting cover 2 is a hub 8 the bore of which has a diameter slightly in excess of that of the stud 3. An annular groove 9 in the hub 8 contains a row of balls 11 adapted to roll on a circular boss 12 of the upper wall of the vehicle.

The hub 8 is resiliently urged toward the boss 12, in the embodiment illustrated, by a cup spring 13 held in place on the stud 3 by a locking nut 14 mounted on the screw-threaded end of the stud 3. The hub 8, therefore, is resiliently held against the boss 12 through the medium of the balls 11, and the pivoting cover 2, hence, may be imparted with a translational movement of short amplitude in a direction parallel with the axis of the stud 3 in order to break any ice film that may form along the peripheral edge of the cover and which could preclude opening the latter, or merely in order to take it out of jammed condition.

In Figure 1, three periscopes or episcopes 15 may be seen which extend through the pivoting cover 2. Between the upper face of the pivoting cover 2 and the inner face of the stationary hood 4 (Figure 3) a free space is left which is large enough for accommodating the protruding portions of the episcopes when the pivoting cover is in retracted position.

In the lower face of the peripheral edge of the pivoting cover 2 is an annular groove 17 containing a seal constituted, in this example, by a rubber tube 18 partially squeezed against the adjacent edge of the shutter 5.

It will be readily understood that, when the pivoting cover is in retracted position, the episcopes are protected against any projection of mud since they are entirely housed under the stationary hood 4.

In order to lock the pivoting cover in operative position as well as in retracted position, provision is made for a locking device which comprises a bolt 21 arranged on the wall of the vehicle (Figure 1). As may be seen more in detail in Figure 4, the bolt 21 is screwed on the end of a control rod 22 provided with a knob 23. The rod 22 is adapted to slide in a support 24 secured to the wall of the vehicle and the bolt 21 is urged into operative position by a coil spring 25. In operative position as represented in Figure 1, the pivoting cover 2 is locked by one of the ends of its peripheral edge, whereas, in retracted position, it is locked by its opposite end, as indicated in chain-dotted lines as at 26 in Figure 4 and also in Figure 1.

One embodiment of the hinged shutters 5 and 6 will now be described. The shutter 5 has one concave edge in the shape of an arc of a circle on which rests the lower edge of the pivoting cover 2 and its opposite edge is provided with two hinge members 31 (Figures 1 and 2) which cooperate with complementary hinge members 32 secured on the adjacent edge of the shutter 6. The latter has, on its opposite edge, two further hinge members 33 which cooperate with two hinge members 34 secured on the adjacent edge of the opening through the upper face 1 of the vehicle. It will be noted that the hinge members 32 are secured on the inner face of the shutter 6 whereas the hinge members 33 are secured on the outer face of this shutter. The object of this arrangement is to make it possible to fold first the shutter 5 inwardly along the semi-circumferential path shown in chain-dotted lines as at 36 in Figure 2, and then, both shutters 5 and 6 as a whole outwardly along the circular path indicated in chain-dotted lines as at 37, because very little room is actually available between the upper face of the vehicle and the weapons when positioned thereabove. The first step in opening the shutters may be seen as at 38 in chain-dotted lines and the assembly of the shutters in fully opened condition is seen as at 39.

Plates 41 and 42 (Figure 2) respectively welded on the shutters 5 and 6 serve the purpose of butt straps. Similar lateral plates 43 (Figure 6) welded of the upper face of the vehicle serve as abutments for the shutter 5 toward the exterior and lateral plates 44 welded on the lateral edges of the shutter 6 serve as abutments for said shutter toward the interior against the wall of the vehicle.

A hook 46 (Figure 2) pivotally mounted on the inner face of the shutter 6 and urged by a spring serves for locking the shutter 5 when the latter is folded flat against the shutter 6.

The shutter 5 also may be locked, on each side thereof, against the wall of the vehicle, by means of a bolt such as 47 (Figure 6) rigid with an operating handle 48 and urged into locking position by a spring 49.

Similar lateral bolts are adapted to lock the shutter 6 in the opposite direction. These bolts indicated as at 51, in Figure 5, are provided with an operating handle 52 and their structure is similar to that of the bolts 47.

It is to be understood that the invention is not limited to the example described and shown and that it may be affected with numerous modifications within the reach of those skilled in the art without departing from the spirit of the invention.

What is claimed is:

1. In a combat vehicle, a hollow body having a top wall provided with an opening through which the head of an occupant may pass, an overhead protection hood bordering said opening so as to leave a front portion thereof uncovered and having its roof at a higher level than said top wall so as to provide a forwardly open head room for said occupant, the said hood having a vertical inner side wall at least a portion of which is arcuate, a rotatable substantially sector-shaped shield member adapted to close said front portion of the opening and comprising an inner portion pivotally and resiliently secured to the inner wall of said roof at a point centrally of said arcuate side wall portion of the hood and a downwardly inclined outer portion having means resiliently engaging an upper surface area of said top wall bordering said front potrion of the opening to seal said opening, said downwardly inclined portion having an outer edge curved concentrically to said arcuate side wall portion of the hood so that said shield member may be rotated from an operative position in which it closes said opening to an inoperative position in which it lies entirely with said hood, and a viewing aperture in said sheld member arranged so as to be approximately in line with the line of sight of said occupant when said shield member is in said operative position.

2. A combat vehicle according to claim 1, in which an optical instrument is inserted in said aperture of the shield member so as to have a part projecting outwardly thereof, the space defined by said arcuate side wall portion of the hood, said side roof and said outer portion of the shield member, when the latter is in said inoperative position, being sufficient to receive said outwardly projecting part of the optical instrument.

3. A combat vehicle according to claim 1, wherein said inner portion of the shield member is provided with an aperture and said roof with a pivot pin extending from said inner wall of the roof downwardly through said aperture and having its free end provided with retaining means to hold said shield member on said pivot pin in axially spaced relation to said inner wall of the roof, and wherein a resilient means is interposed between said retaining means and said shield member to yieldingly urge the latter towards said inner wall of the roof.

References Cited in the file of this patent

UNITED STATES PATENTS

| | | |
|---|---|---|
| 923,895 | Ryburg et al. | June 8, 1909 |
| 1,160,713 | Heubach | Nov. 16, 1915 |
| 1,203,962 | Bellamore | Nov. 7, 1916 |
| 1,392,095 | Valinski | Sept. 27, 1921 |
| 1,578,310 | Campbell | Mar. 30, 1926 |
| 1,928,306 | Brennan | Sept. 26, 1933 |
| 2,051,753 | Steckley | Aug. 18, 1936 |
| 2,454,268 | Brackett | Nov. 23, 1948 |